United States Patent [19]

Yoshimatsu

[11] Patent Number: 5,063,742

[45] Date of Patent: Nov. 12, 1991

[54] METHOD OF CONTROLLING SWING MOTION OF A REVOLVING SUPERSTRUCTURE AND HYDRAULIC CONTROL SYSTEM FOR CARRYING OUT SAME

[75] Inventor: Hideaki Yoshimatsu, Akashi, Japan

[73] Assignee: Kabushiki Kaisha Kobe Seiko Sho, Kobe, Japan

[21] Appl. No.: 385,197

[22] Filed: Jul. 26, 1989

[51] Int. Cl.⁵ ............................ E02F 9/12; E02F 9/20; E02F 9/22; E02F 3/32

[52] U.S. Cl. .................................. 60/466; 60/468; 60/494

[58] Field of Search ................... 60/460, 464, 466, 468, 60/494

[56] References Cited

U.S. PATENT DOCUMENTS

| | | | |
|---|---|---|---|
| 3,125,324 | 3/1964 | Vivier | 60/466 X |
| 4,481,770 | 11/1984 | Lohbauer et al. | 60/468 X |
| 4,548,036 | 10/1985 | Matsuda et al. | 60/464 |
| 4,628,690 | 12/1986 | Arai et al. | 60/464 |
| 4,845,948 | 7/1989 | Tha et al. | 60/460 X |

FOREIGN PATENT DOCUMENTS

| | | |
|---|---|---|
| 0056865 | 8/1982 | European Pat. Off. . |
| 0209123 | 1/1987 | European Pat. Off. . |
| 0309987 | 4/1989 | European Pat. Off. . |
| 2538575 | 6/1984 | France . |
| 133350 | 12/1978 | German Democratic Rep. .... 60/464 |
| 24210 | 2/1980 | Japan ..................... 60/460 |
| 55390 | 3/1984 | Japan . |
| 30730 | 2/1985 | Japan . |
| 88730 | 5/1985 | Japan . |
| 168901 | 9/1985 | Japan . |
| 2000326 | 1/1979 | United Kingdom . |

Primary Examiner—John T. Kwon
Assistant Examiner—George Kapsalas
Attorney, Agent, or Firm—Oblon, Spivak, McClelland, Maier & Neustadt

[57] ABSTRACT

A method of controlling the slewing of a revolving superstructure of a hydraulic backhoe includes setting a swing mode selector valve in a driving position to supply fluid discharged from a pump through a supply-and-discharge line to a hydraulic motor to drive the hydraulic motor for a driving operation, setting one of a pair of relief valves provided between the swing mode selector valve and the hydraulic motor, associated with the supply side of the hydraulic motor for a set relief pressure higher than the set relief pressure of a main relief valve for limiting the pressure in supply-and-discharge lines to the set relief pressure of the main relief valve while the hydraulic motor is operating in a driving mode, and setting the other relief valve associated with the discharge side of the hydraulic motor for a set relief pressure lower than the set relief pressure of the main relief valve to limit the pressure in the supply-and-discharge line associated with the discharge side of the hydraulic motor to the set relief pressure of the other relief valve while the hydraulic motor is operating in a braking mode. The method brakes the slewing mechanism smoothly to prevent the rapid abrasion of the braking surfaces of the components of the slewing mechanism.

4 Claims, 7 Drawing Sheets

METHOD OF CONTROLLING SWING MOTION OF A REVOLVING SUPERSTRUCTURE AND HYDRAULIC CONTROL SYSTEM FOR CARRYING OUT SAME

BACKGROUND OF THE INVENTION

1. Field of the Invention

The present invention relates to a method of controlling the swing motion of a revolving superstructure such as for a shovel loader or a backhoe, capable of controlling the hydraulic pressure for driving a hydraulic motor for slewing the revolving superstructure, and a hydraulic control system for carrying out the same.

2. Description of the Prior Art

FIG. 6 shows a hydraulic backhoe comprising a base carrier 110, a revolving superstructure 120 mounted for swing motion on the base carrier 110, a boom 130 pivotally supported on the revolving superstructure 120, an arm 140 pivotally joined to the extremity of the boom 130, and a bucket 150 pivotally joined to one end of the arm 140. The boom 130, the arm 140 and the bucket 150 are operated respectively by a boom cylinder actuator 131, an arm cylinder actuator 141 and a bucket cylinder actuator 151.

The revolving superstructure 120 is driven for swing motion and is braked to a stop by a slewing mechanism as shown in FIG. 7. Referring to FIG. 7, the revolving frame 121 of the revolving superstructure 120 is supported for swing motion on a swing bearing 160 on a lower frame 111 mounted on the base carrier 110. The outer race 161 of the swing bearing 160 is fixed to the revolving frame 121. The inner race 162 of the swing bearing 160 is provided with an internal gear 163, and a hydraulic motor 170 and a reduction gear 171 are mounted on the revolving frame 121 with a pinion 172 fixedly mounted on the output shaft of the reduction gear 171 in engagement with the internal gear 163. The hydraulic motor 170 is controlled to drive or to brake the revolving superstructure 120 through the reduction gear 171, the pinion 172 and the internal gear 163.

J.P. Provisional Pub. No. 53-21379 discloses a hydraulic circuit as shown in FIG. 8 for a hydraulic crane, capable of regulating driving pressure for driving the revolving superstructure and braking pressure for braking the revolving superstructure according to the operated angle of a swing motion control lever 200. The swing motion control lever 200 is shifted in the normal direction indicated by an arrow head A to a driving position, so that a pilot valve 210 supplies a pilot fluid of a pilot pressure in a direction B to set a swing mode selector valve 220 in a driving position, i.e., a position shown on the left side in FIG. 8. Then, a working fluid at a line pressure discharged from a hydraulic pump 230 is supplied to a hydraulic motor 240 in a direction D to drive the hydraulic motor 240 for rotation in a direction E. At the same time, the pilot pressure is applied to the relief pressure control unit 251 of a supply pressure relief valve 250 associated with the supply side of the hydraulic motor 240 (corresponds to hydraulic motor 170 of FIG. 7) to control the relief pressure, according to the pilot pressure and thus the motor driving pressure for driving the hydraulic motor 240 is controlled. When the swing motion control lever 200 is returned to a neutral position, the swing mode selector valve 220 is set in a neutral position to connect lines 241 and 242 connected to the opposite sides of the hydraulic motor 240 so that the hydraulic motor 240 continues inertial rotation for a so-called neutral idle operation.

The swing motion control lever 200 is shifted from the neutral position in the reverse direction indicated by an arrow head A' to a braking position for positive braking, whereby the pilot fluid is supplied in a direction B' to set the swing mode selector valve 220 in a braking position, i.e., a position on the right side in FIG. 8, so that the working fluid at the line pressure is supplied in a direction D', i.e., a direction reverse to the direction of flow of the working fluid discharged from the hydraulic motor 240. Consequently, the pressure in the line 242 on the discharge side of the hydraulic motor 240 increases to brake the hydraulic motor 240. At the same time, the pilot pressure is applied to the relief pressure control unit of a discharge pressure relief valve 260 associated with the discharge side of the hydraulic motor 240 to control the relief pressure of the discharge pressure relief valve 260 according to the reverse operated angle of the swing motion control lever 200 and thus the pressure for braking the hydraulic motor 240 is controlled.

It is known from the examination of the engagement of the power transmitting members of this slewing mechanism including the internal gear 163 of the swing bearing 160, the pinion 172, and the power transmitting members of the reduction gear 171 that the power acting on the power transmitting members during a braking operation is greater than that acting on the power transmitting members during a driving operation due to differences between the braking operation and the driving operation in power transmitting direction even if the effective pressure difference in the hydraulic motor 240 is the same. Consequently, the working surfaces of the power transmitting members acting during the braking operation (hereinafter referred to as "braking surfaces") are abraded more rapidly than the working surfaces of the same acting during the driving operation (hereinafter referred to as "driving surfaces"), and hence the braking surfaces are required to have a high fatigue strength. Thus the life of the slewing mechanism is dependent on the life of the braking surfaces of the power transmitting members. Accordingly, it is desirable to design and to operate the internal gear 163, the pinion 172 and the reduction gear 171 so that the life of the driving surfaces thereof and that of the braking surfaces thereof are the same. Since the critical tilt angle, namely, a limit tilt angle of the revolving superstructure below which the revolving superstructure is able to swing, is one of the criteria for evaluating the swinging performance of the hydraulic backhoe, it is desirable to increase the driving pressure to the highest possible level to increase the torque for slewing the revolving superstructure.

When the foregoing hydraulic circuit shown in FIG. 8 is applied to the slewing mechanism, the set point for the driving operation of the supply pressure relief valve 250 associated with the supply side of the hydraulic motor 240 and the set point for the braking operation of the discharge pressure relief valve 260 associated with the discharge side of the hydraulic motor 240 are controlled similarly according to the operated angle of the swing motion control lever 200. Accordingly the maximum braking pressure coincides with the maximum driving pressure and hence an excessive force acts on the braking surfaces of the slewing mechanism in braking the revolving superstructure to shorten the life of the component members of the slewing mechanism remarkably.

SUMMARY OF THE INVENTION

Accordingly, it is an object of the present invention to provide a method of controlling the swing motion of a revolving superstructure, capable of preventing the increase of the braking pressure beyond the driving pressure in braking the revolving superstructure, continuously maintaining the braking pressure below the driving pressure for smooth braking, and significantly extending the life of the braking surfaces of the component members of the slewing mechanism dominating the life of the slewing mechanism.

It is another object of the present invention to provide a hydraulic control system for carrying out the foregoing method of controlling the swing motion of a revolving superstructure.

In one aspect of the present invention, a method of controlling the swing motion of a revolving superstructure comprises setting a swing mode selector valve in a driving position to supply a working fluid discharged from a hydraulic pump through one of two supply-and-discharge lines to a hydraulic motor to drive the hydraulic motor for a driving operation; setting a main relief valve common to both of said supply-and-discharge lines to a set pressure; setting a relief valve provided in one of said supply-and-discharge lines between the swing mode selector valve and the hydraulic motor, associated with the supply side of the hydraulic motor to a set relief pressure higher than the set relief pressure of the main relief valve for limiting the pressure in supply-and-discharge lines to limit the pressure in the supply-and-discharge lines to the set relief pressure of the main relief valve while the hydraulic motor is operating in a driving mode; and setting the other relief valve in the other supply-and-discharge line associated with the discharge side of the hydraulic motor for a set relief pressure lower than the set relief pressure of the main relief valve to limit the pressure in the other supply-and-discharge line associated with the discharge side of the hydraulic motor to the set relief pressure of the other relief valve while the hydraulic motor is operating in a braking mode.

In another aspect of the present invention, a hydraulic control system for controlling the slewing motion of a slewing mechanism for slewing a revolving superstructure comprises a hydraulic pump; a swing mode selector valve fluidically connected to the hydraulic pump; and a hydraulic motor for driving the slewing mechanism; two supply-and-discharge lines, each of the supply-and-discharge lines being connected between the swing mode selector valve and a respective port of the hydraulic motor for selectively supplying pressurized fluid to a supply side port of the hydraulic pump when the system is in a driving operating mode; a main relief valve common to both of the supply-and-discharge lines; wherein a pair of relief valves capable of being set for a high set relief pressure higher than the set relief pressure of the main relief valve and for a low set relief pressure lower than the set relief pressure of the main relief valve are provided in respective ones of the supply-and-discharge lines connected to the supply-and-discharge ports of the hydraulic motor, operating mode detecting means for detecting the operating mode of the hydraulic motor is associated with the hydraulic motor, and set relief pressure changing means sets the relief valve associated with the supply side of the hydraulic motor for the high set relief pressure in response to a detection signal provided by the operating mode detecting means only while the hydraulic motor is operating in a driving mode, and maintains the respective relief pressures of the relief valves at the low set relief pressure while the hydraulic motor is operating in a mode other than the driving mode.

The operating mode detecting means decides whether or not the hydraulic motor is operating in the driving mode on the basis of detection signals provided by rotating direction detecting means for detecting the rotating direction of the hydraulic motor, and shift position detecting means for detecting the position of a control lever for controlling a swing mode selector valve.

The set relief pressure changing means comprises a pair of pilot selector valves each having a high relief pressure setting position for giving a high relief pressure setting signal to the relief pressure setting unit of the associated relief valve and a low relief pressure setting position for giving a low relief pressure setting signal to the relief pressure setting unit of the same relief valve, and capable of being changed between the high relief pressure setting position and the low relief pressure setting position by hydraulic signals or electric signals given thereto.

According to the present invention, the relief valve on the supply side is set for the higher set point higher than the relief pressure of the main relief valve during the driving operation of the hydraulic motor to control the driving pressure applied to the hydraulic motor to drive the revolving superstructure for swing motion, the relief valve on the discharge side is set for the lower set point lower than the relief pressure of the main relief valve during the braking operation of the hydraulic motor to control the discharge pressure of the hydraulic motor below the relief pressure of the main relief valve so that the braking pressure is lower than the driving pressure. Accordingly, even when the control lever is shifted in the reverse direction, the relief valve of the discharge side can be set for a set point below the set point of the main relief valve to maintain the braking pressure below the driving pressure, so that the revolving superstructure can be braked smoothly and thereby the life of the braking surfaces of the slewing mechanism, hence the life of the slewing mechanism, is extended remarkably.

The driving pressure and the braking pressure are regulated properly by the hydraulic control system.

Furthermore, since the operating mode of the hydraulic motor, namely, the driving mode or the braking mode, is detected on the basis of the output signals of the rotating direction detecting means and the control position detecting means for detecting the position of the control lever for controlling the swing mode selector valve, and the driving pressure applied to the hydraulic motor is elevated to drive the hydraulic motor appropriately in driving the hydraulic motor to revolve the revolving superstructure, in accelerating the hydraulic motor, and in slewing the revolving superstructure upward on a slope.

The set points of the supply pressure relief valve and the discharge pressure relief valve are changed precisely by a pilot selector valve or a solenoid selector valve for improved control operation.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENTS

Figure 1:
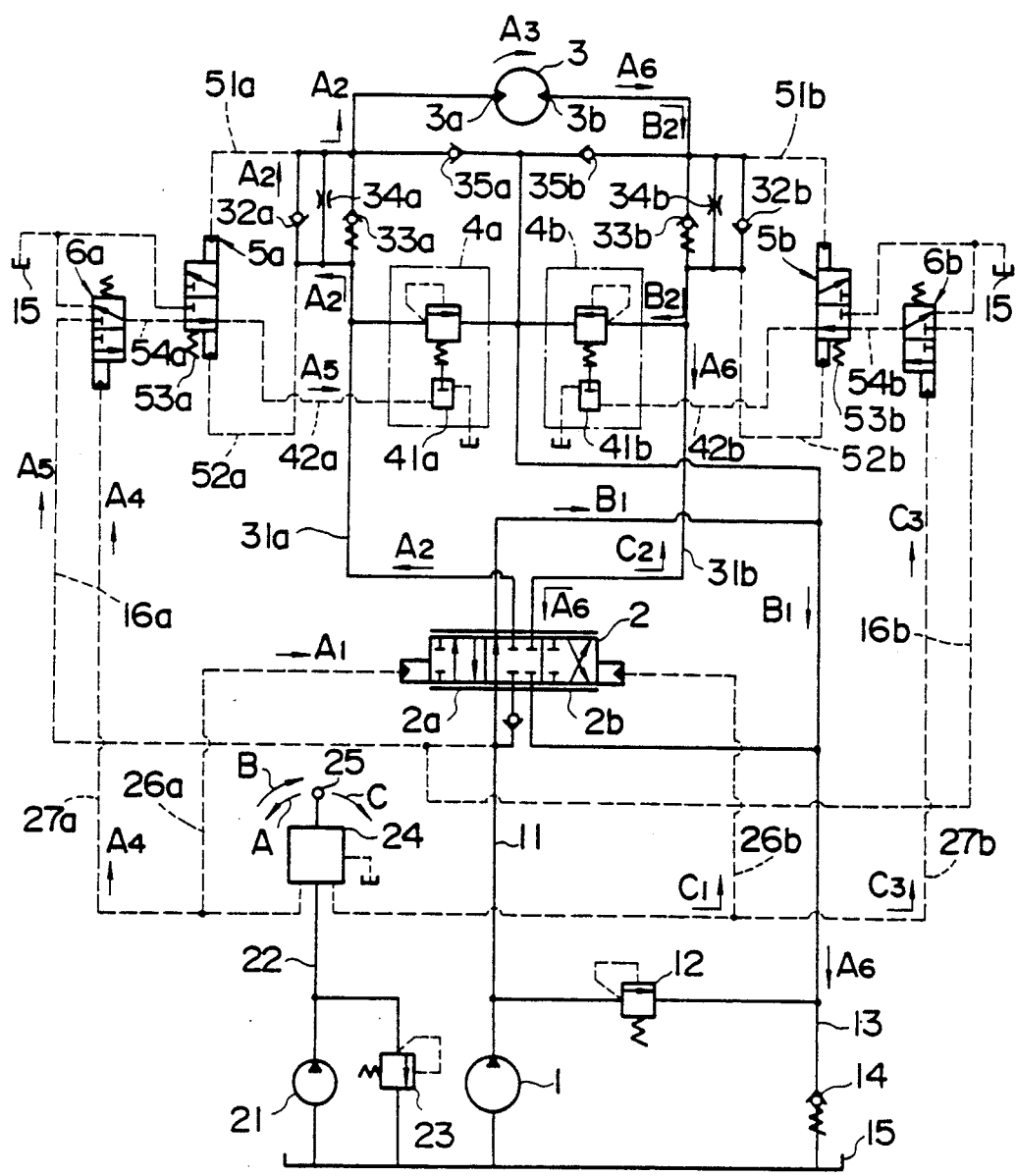
FIG. 1 is a hydraulic circuit diagram of a hydraulic control system in a first embodiment according to the present invention.

First Embodiment (FIG. 1)

Figure 7:
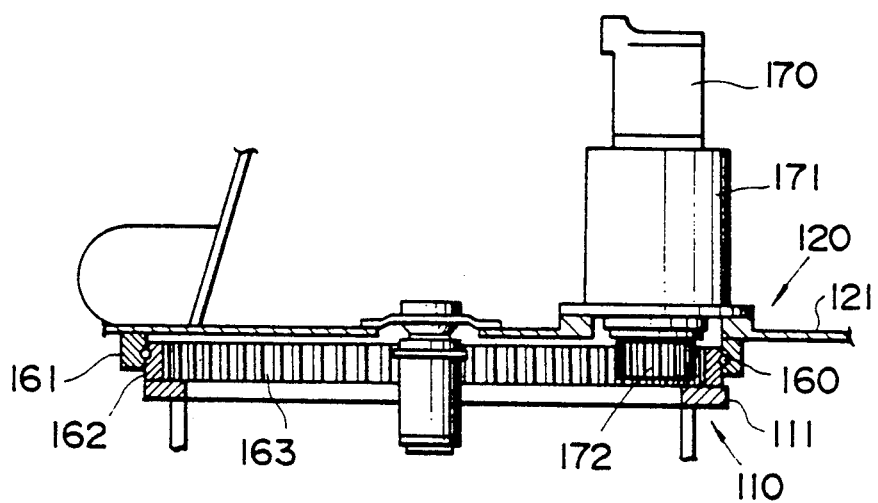
FIG. 7 is a sectional view of a slewing mechanism for slewing the revolving superstructure of the backhoe of FIG. 6.
Figure 8:
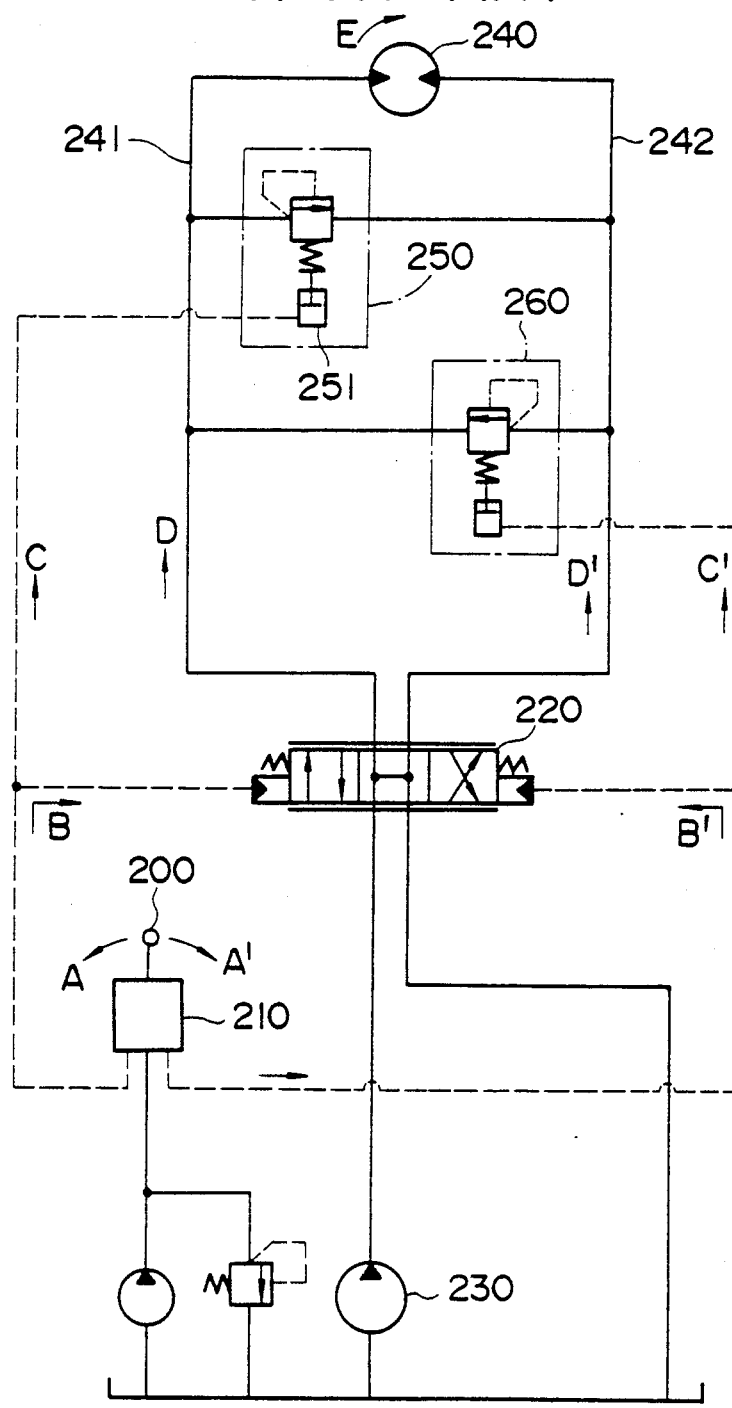
FIG. 8 is a hydraulic circuit diagram of a conventional hydraulic control system for controlling the swing motion of the revolving superstructure of a hydraulic backhoe.

Referring to FIG. 1 showing a hydraulic control system in a first embodiment according to the present invention, there are shown a main hydraulic pump 1, a swing mode selector valve 2, a hydraulic motor 3 (corresponds to hydraulic motor 170 of FIG. 7) for driving a revolving superstructure, a supply pressure relief valve 4a, a discharge pressure relief valve 4b, direction detecting pilot selector valves 5a and 5b for detecting the rotating direction of the hydraulic motor 3, and position detecting pilot selector valves 6a and 6b for detecting the position of a control lever 25. A main relief valve 12 is connected to a line 11 connected to the discharge port of the hydraulic pump 1. Also shown in FIG. 1 are a return line 13, a back-pressure regulating valve 14, a fluid tank 15, and pilot lines 16a and 16b.

The swing mode selector valve 2 is a three-position restricting selector valve, which establishes a PR port connection when placed in the neutral position, controlled by a swing mode control valve 24. The swing mode control valve 24 comprises a pair of variable pressure reducing valves, not shown. A pilot hydraulic pump 21 and a pilot relief valve 23 are connected to a supply line 22 connected to the inlet port of the swing mode control valve 24. The pressure of the pilot working fluid in the supply line 22 is regulated at a fixed pressure by the pilot relief valve 23. The swing mode control valve 24 applies a pilot pressure through the outlet port of one of the variable pressure reducing valves to either pilot lines 26a and 27a or pilot lines 26b and 27b according to the position of a control lever 25, namely, an operated direction and an operated angle of the control lever 25, to place the swing mode selector valve 2 in a driving position (a left position) 2a or in a braking position (a right position) 2b and to change either the pilot selector valve 6a or 6b from an upper position to a lower position. The swing mode selector valve 2 may be operated manually or electrohydraulically by means of a solenoid-operated proportional pressure reducing valve.

The inlet port of the relief valve 4a is connected to a supply-and-discharge line 31a connected between one of the outlet ports of the swing mode selector valve 2 and the port 3a of the hydraulic motor 3, and the inlet port of the relief valve 4b is connected to a supply-and-discharge line 31a connected between the other outlet port of the swing mode selector valve 2 and the port 3b of the hydraulic motor 3. The outlet ports of the relief valves 4a and 4b are connected to the fluid tank 15 via the return line 13. Indicated at 35a and 35b are check valves for preventing cavitation.

The relief valves 4a and 4b are direct acting (differential area) relief valves. The set point of the relief valve 4a (4b) is changed from a high set relief pressure $P_H$ to a low set relief pressure $P_L$ by applying a pilot pressure (a high set point command signal) to a pilot chamber (set point control unit) 41a (41b) behind a push rod engaging a relief pressure adjusting spring. The set relief pressure $P_M$ of the main relief valve 12, and the high set relief pressure $P_H$ and low set relief pressure $P_L$ of the relief valves 4a and 4b meet the inequality:

$$P_H > P_M > P_L$$

For example, $P_H = 230$ kg/cm$^2$, $P_m = 210$ kg/cm$^2$ and $P_L = 170$ kg/cm$^2$.

A rotating direction detecting circuit for detecting the rotating direction of the hydraulic motor 3 comprises a parallel arrangement of a check valve 32a limiting the flow of the working fluid to a supply direction and a check valve 33a limiting the flow of the working fluid to the return direction provided in the supply-and-discharge line 31a connecting the swing mode selector valve 2 to the port 3a of the hydraulic motor 3, a parallel arrangement of a check valve 32b limiting the flow of the working fluid to the supply direction and a check valve 33b limiting the flow of the working fluid to the return direction provided in the supply-and-discharge line 31b connecting the swing mode selector valve 2 to the port 3b of the hydraulic motor 3, and pilot selector valves 5a and 5b which are controlled by the pressure differences between the pressure before and the pressure after the check valves 33a and 33b, respectively. The opening pressure $P_O$ of the check valves 33a and 33b is higher than the opening pressure $P_I$ of the check valves 32a and 32b. For example, $P_O = 5.0$ kg/cm$^2$ and $P_I = 0.3$ kg/cm$^2$. Indicated at 34a and 34b are restrictors. The pilot selector valves 5a and 5b have a lower position as viewed in FIG. 1 for connecting pilot lines 42a and 42b connected to the set point control units 41a and 41b of the relief valves 4a and 4b to pilot lines 54a and 54b, respectively, and an upper position (a low set pressure position) for connecting the pilot lines 42a and 42b to the fluid tank 15. The pilot selector valves 5a and 5b are biased to the respective lower positions by the resilient force $P_S$, for example, 3 kg/cm$^2$, of springs 53a and 53b, which force is smaller than the opening pressure $P_I$ of the check valves 33a and 33b, respectively. The position of the pilot selector valves 5a and 5b is dependent on the pressure difference between the pressure in pilot lines 51a and 51b connected respectively to the upper sides of the pilot selector valves 5a and 5b, and the pressure in pilot lines 52a and 52b connected respectively to the lower sides of the pilot selector valves 5a and 5b.

The control operation of the hydraulic control system will be described hereinafter.

I. Driving Operation

When the control lever 25 is shifted in a direction A, the fluid of a pilot pressure flows in a direction $A_1$ to set the swing mode selector valve 2 in the left position 2a and, consequently, the working fluid discharged by the hydraulic pump 1 flows in a direction $A_2$ through the check valve 32a into the port 3a of the hydraulic motor 3 to drive the hydraulic motor 3 for rotation in the normal direction $A_3$, so that the revolving superstructure 120 (FIG. 6) is revolved in the normal direction. The pilot fluid of the pilot pressure flows also in a direction $A_4$ to place the pilot selector valve 6a in the lower position. The pilot selector valve 5a is held in the lower position by the spring 53a. Therefore, the working fluid of a pressure $P_p$ discharged from the hydraulic pump 1 flows in a direction $A_5$ into the pilot chamber 41a of the relief valve 4a to set the relief valve 4a for the high set relief pressure $P_H$ (230 kg/cm$^2$), which is higher than the set relief pressure $P_M$ (210 kg/cm$^2$) of the main relief valve 12.

Thus, the relief valve 4a on the inlet side of the hydraulic motor 3 does not relieve pressure and only the main relief valve 12 operates to limit the pressure applied to the port 3a of the hydraulic motor 3 to the set relief pressure $P_M$ (210 kg/cm$^2$) of the main relief valve 12 while the hydraulic motor 3 is driven. During the driving operation, the working fluid discharged from the hydraulic motor 3 flows through the check valve 33b in a direction $A_6$ and returns to the fluid tank 15. Since a pressure before the check valve 33b and a pressure after the check valve 33b prevail respectively in pilot lines 51b and 52b, and the opening pressure $P_I$ (5 kg/cm$^2$) of the check valve 32b is higher than the resilient force $P_S$ (3 kg/cm$^2$) of the pilot selector valve 6b, the pressure on the inlet side of the check valve 32b is higher than the pressure on the outlet side of the same, and thereby the pilot selector valve 5b is placed in the upper position as viewed in FIG. 1. Consequently, the pilot chamber 41b of the relief valve 4b on the discharge side of the hydraulic motor 3 is connected to the fluid tank 15, so that the relief valve 4b is set for the low set relief pressure $P_L$ (170 kg/cm$^2$) lower than the set relief pressure $P_M$ (210 kg/cm$^2$) of the main relief valve 12. The relief valve 4b thus remains inoperative and the working fluid of a reduced pressure discharged from the hydraulic motor 3 returns to the fluid tank 15 since the supply-and-discharge line 31b connected to the port 3b of the hydraulic motor 3 is connected through the swing mode selector valve 2 to the fluid tank 15. Thus, the revolving superstructure 120 is revolved smoothly.

II. Braking Operation

When the control lever 25 is shifted in a direction B to a neutral position during the driving operation, the discharge line 11 connected to the outlet port of the hydraulic pump 1 is connected to the return line 13 so that the working fluid discharged from the hydraulic pump 1 flows in a direction $B_1$ into the fluid tank 15, and the supply-and-discharge line 31a connected to the port 3a of the hydraulic motor 3 and the supply-and-discharge line 31b connected to the port 3b of the hydraulic motor 3 are blocked by the swing mode selector valve 2. However, the hydraulic motor 3 continues inertial rotation in the direction $A_3$ discharging the working fluid in the direction $B_2$. Consequently, the pressure in the supply-and-discharge line 31b connected to the port 3b of the hydraulic motor 3 increases gradually, the relief valve 4b relieves the pressure, and the hydraulic motor 3 decelerates gradually to a stop.

The pressure on the discharge side of the hydraulic motor 3, i.e., the braking pressure, is dependent on the set point of the relief valve 4b connected to the supply-and-discharge line 31b. During the braking operation, the working fluid discharged from the hydraulic motor 3 flows through the check valve 33b in the direction $B_2$, the pilot selector valve 5b is held in the upper position by the pressure difference across the check valve 33b, and the pilot chamber 41b of the relief valve 4b is connected to the fluid tank 15. Since the set point of the relief valve 4b is maintained at the low set relief pressure $P_L$ (170 kg/cm$^2$), the pressure in the supply-and-discharge line 31b connected to the port 3b of the hydraulic motor 3 is relieved at a pressure (170 kg/cm$^2$) which is below the pressure (210 kg/cm$^2$) prevailing in the supply-and-discharge line 31b during the driving operation, so that the hydraulic motor 3 is decelerated smoothly to a stop.

Thus, the hydraulic motor 3 is decelerated and stopped automatically by returning the control lever 25 to the neutral position for the so-called automatic neutral braking operation. Since the braking pressure is lower than the driving pressure, the braking surfaces of the component members of the slewing mechanism are not exposed to an excessively large decelerating force, and thereby the life of the braking surfaces, hence the life of the slewing mechanism, is extended.

III. Positive Braking Operation

When the control lever 25 is reversed beyond the neutral position in the opposite direction, i.e., the direction C, for positive braking of the hydraulic motor 3, the pilot fluid flows from the swing mode control valve 24 in a direction $C_1$ to shift the swing mode selector valve 2 to a right position 2b, whereby the working fluid discharged from the hydraulic pump 1 flows through the supply-and-discharge line 31b in a direction $C_2$. If the hydraulic motor 3 is rotating by inertia in the direction $A_3$, the working fluid discharged through the port 3b of the hydraulic pump 1 and the working fluid discharged from the hydraulic pump 1 both flow into the supply-and-discharge line 31b and, consequently, the pressure in the supply-and-discharge line 31b increases rapidly to decelerate the hydraulic motor 3 at a high decelerating rate to a quick stop.

Furthermore, in this state, the pilot fluid of the pilot pressure flows through a line 27b in a direction $C_3$ to place the pilot selector valve 6b in the lower position. However, the working fluid discharged in the direction $B_2$ from the hydraulic motor 3 flows through the check valve 33b as long as the hydraulic motor 3 continues inertial rotation and the pressure difference across the check valve 33b places the pilot selector valve 5b in the upper position, and hence the set point of the relief valve 4b is maintained at the low set relief pressure $P_L$. Accordingly, the increased pressure in the supply-and-discharge line 31b is relieved at the low set relief pressure $P_L$ to decelerate the hydraulic motor 3 to a stop. Thus, the set point of the relief valve 4b is maintained at the low set relief pressure $P_L$ also during the positive braking of the hydraulic motor 3 and hence the braking pressure is smaller than the driving pressure. Therefore, the braking surfaces of the slewing mechanism are not exposed to an excessively large force, and thereby the life of the slewing mechanism is extended.

When the control lever 25 is reversed in the direction C after the hydraulic motor 3 has been thus stopped, the working fluid discharged from the hydraulic pump 1 flows through the port 3b into the hydraulic motor 3 to drive the hydraulic motor 3 in the reverse direction. In this state, the relief valve 4b limits the supply pressure while the relief valve 4a limits the discharge pressure.

The present invention is not limited in its application to the foregoing hydraulic control system, and may be practiced in the following embodiments shown in FIGS. 2 to 5, in which parts like or corresponding to those described with reference to FIG. 1 are denoted by the same reference characters.

Figure 2:
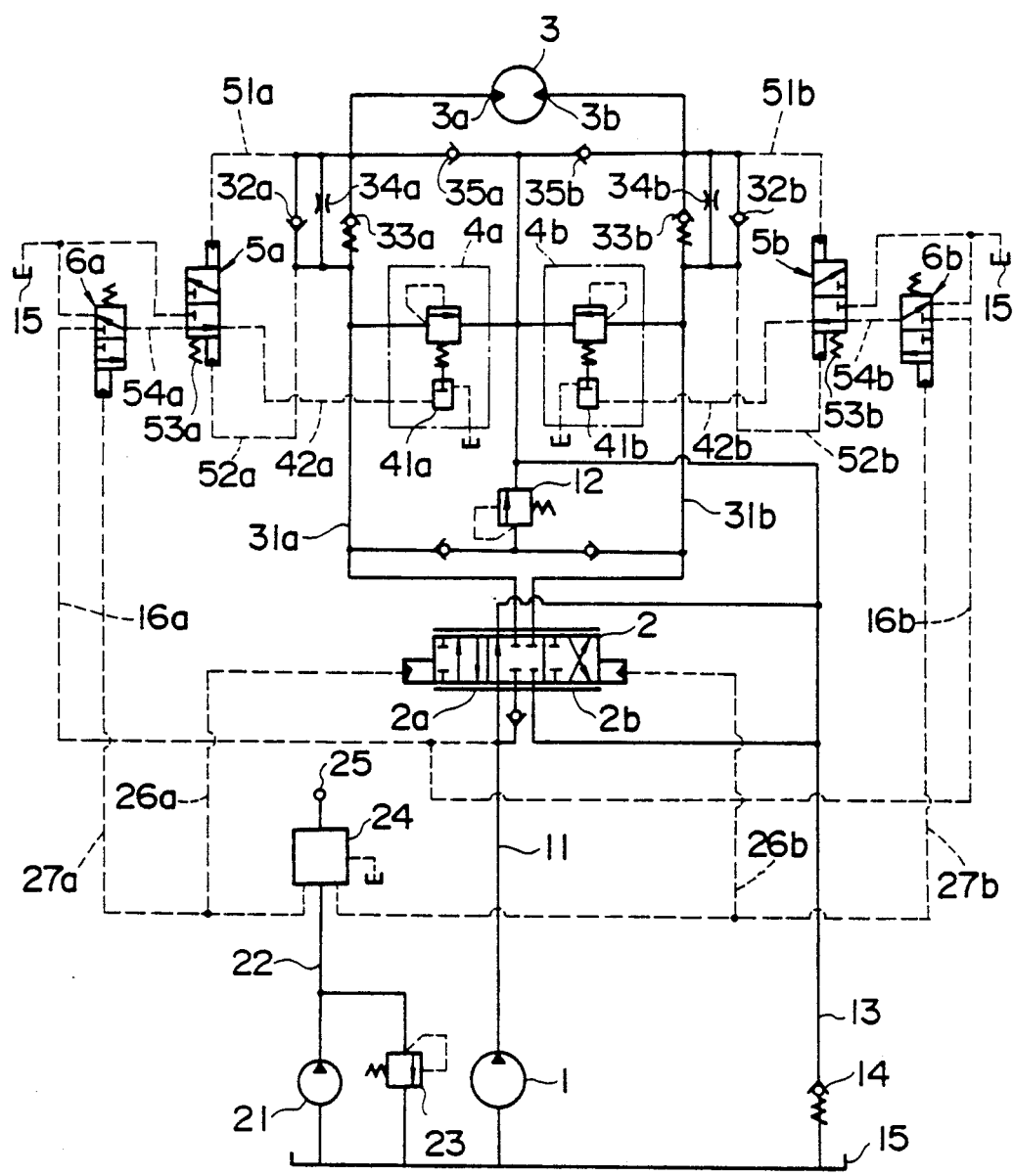
FIGS. 2, 3, 4 and 5 are hydraulic circuit diagrams, of second, third, fourth and fifth embodiments according to the present invention, respectively.

Second Embodiment (FIG. 2)

A hydraulic control system in a second embodiment according to the present invention has a main relief valve 12 provided in a line connecting a swing mode selector valve 2 and a hydraulic motor 3. The action and effects of the hydraulic control system of FIG. 2 are the same as those of the hydraulic control system of FIG. 1.

Figure 3:
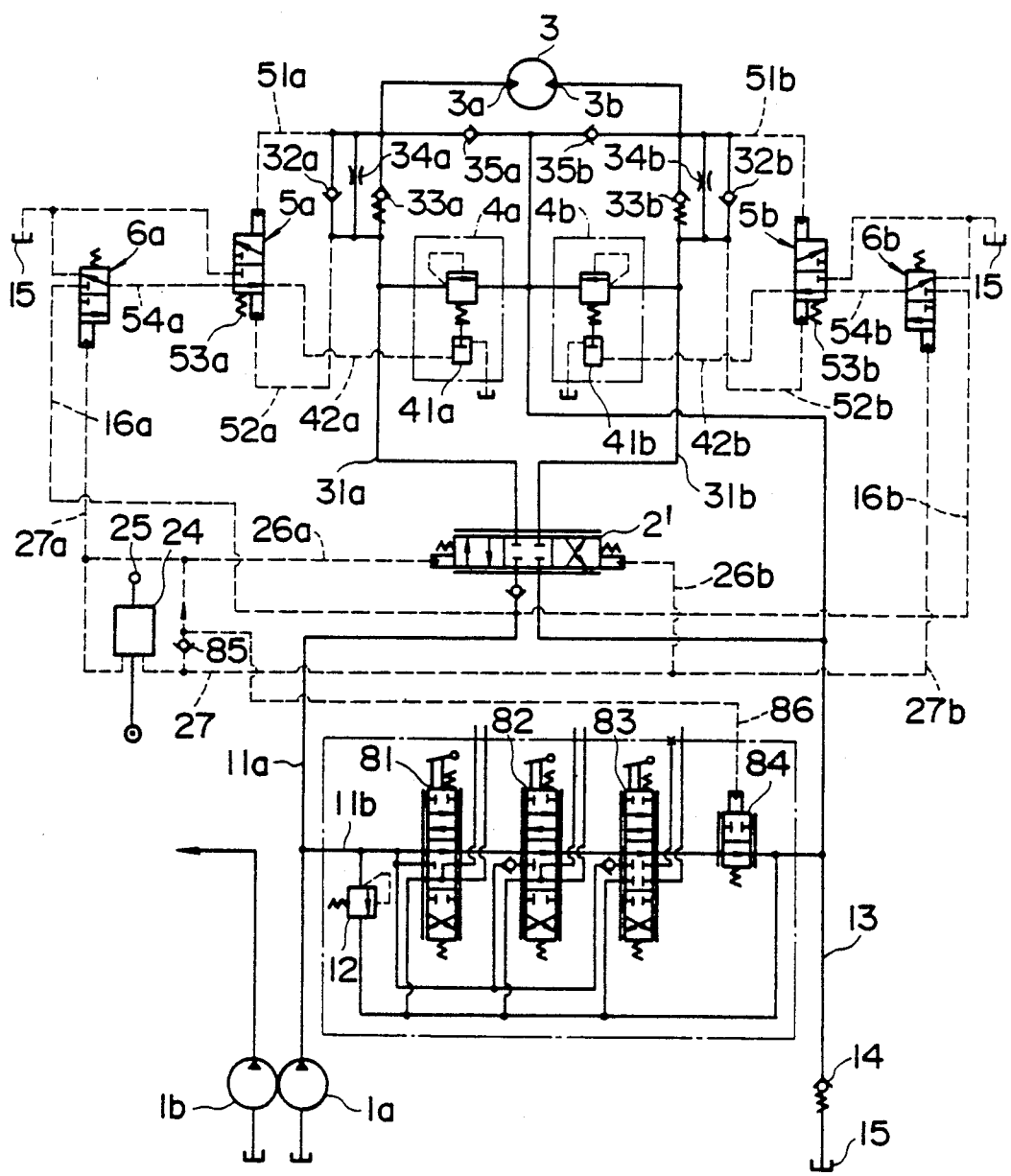

Third Embodiment (FIG. 3)

The hydraulic control systems of FIGS. 1 and 2 are applied to an individual slewing hydraulic circuit, namely, a three-pump hydraulic circuit, while a hydraulic control circuit in a third embodiment according to the present invention is applied to a two-pump hydraulic circuit.

Figure 6:
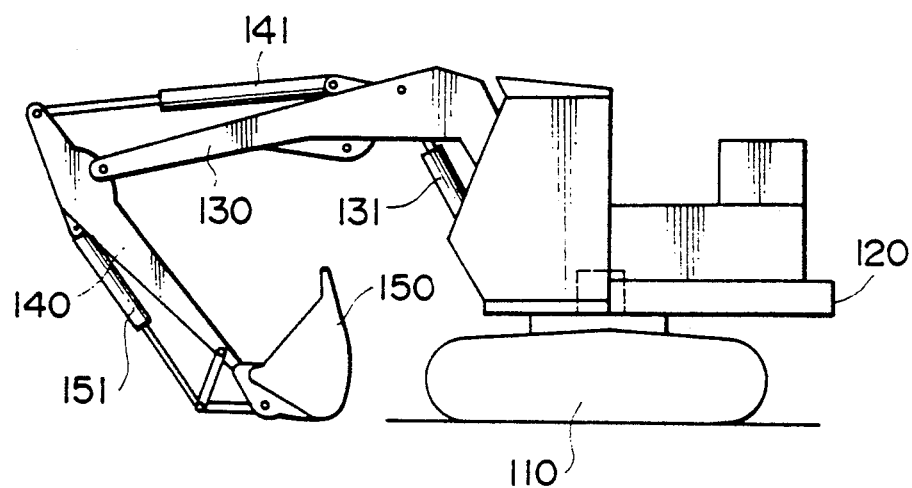
FIG. 6 is a side elevation showing the external appearance of a hydraulic backhoe to which the present invention is applied.

Referring to FIG. 3, a hydraulic backhoe, not shown, is provided with two hydraulic pumps 1a and 1b. A line 11a for supplying the working fluid to a slewing mechanism, and a line 11b for supplying the working fluid to cylinder actuators are connected to the hydraulic pump 1a. The line 11a is connected to a swing mode selector valve 2' which in turn is connected to a hydraulic motor 3 for driving the slewing mechanism. The line 11b is connected to a running mode selector valve 81, an arm first speed selector valve 82 and a boom second speed selector valve 83 connected respectively to one of two running hydraulic motors, not shown, an arm cylinder actuator 141 (FIG. 6) and a boom cylinder actuator 131 (FIG. 6). An unloading valve 84 is provided in the line 11b after the boom second speed selector valve 83. Indicated at 85 is a shuttle valve and at 86 is a pilot line.

The other pump 1b is associated through another running mode selector valve, an arm second speed selector valve, a boom first speed selector valve and a bucket operating mode selector valve respectively with the other running hydraulic motor, the arm cylinder actuator 141 (FIG. 6), a boom cylinder actuator 131 (FIG. 6) and a bucket cylinder actuator 151 (FIG. 6).

Referring to FIG. 3, when the control lever 25 of a swing mode control valve 24 is operated to supply the pilot fluid at a pilot pressure to a pilot line 26a or 26b to place the swing mode selector valve 2' in a left position or a right position, the high-pressure port of the shuttle valve 85 is selected to supply the pilot fluid to a pilot line 86 so that a selector valve 84 is placed in a blocking position, the working fluid discharged from the hydraulic pump 1a is supplied to the hydraulic motor 3 to drive the slewing mechanism for slewing the revolving superstructure 120. During the driving operation of the hydraulic motor 3, a relief valve 4a on the supply side of the hydraulic motor 3 is set for a relief pressure higher then the relief pressure of a main relief valve 12 and a relief valve 4b on the discharge side of the hydraulic motor 3 is set for a relief pressure lower than the relief pressure of the main relief valve 12, so that the line pressure is limited to the relief pressure of the main relief valve 12. When the control lever 25 is placed at the neutral position to brake the hydraulic motor 3 or at the reverse position to stop the hydraulic motor 3, the discharge pressure is limited to the relief pressure of the relief valve 4b on the discharge side of the hydraulic motor 3, which is lower than the relief pressure of the main relief valve 12.

When the revolving superstructure 120 need not be turned, the unloading valve 84 is placed in an unloading position shown in FIG. 3 to return the working fluid discharged from the hydraulic pump 1a through the selector valves 81, 82 and 83 and the unloading valve 84 to a fluid tank 15. The selector valves 81, 82 and 83 are operated to supply the working fluid to the running hydraulic motor, the arm cylinder actuator and the boom cylinder actuator for running, arm first speed operation and boom second speed operation to use the working fluid discharged from the hydraulic pump 1a effectively.

Figure 4:
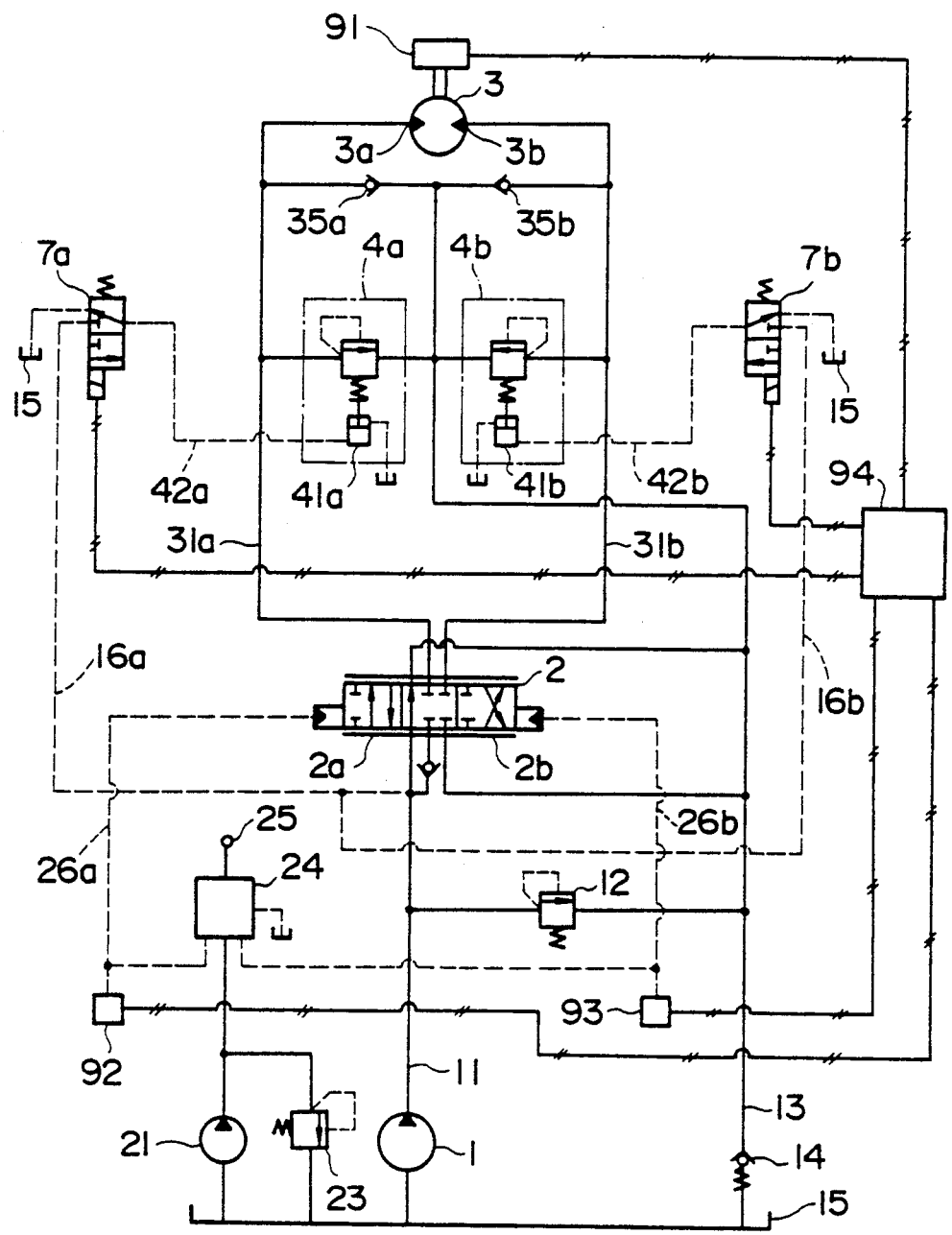

Fourth Embodiment (FIG. 4)

A hydraulic control circuit in a fourth embodiment according to the present invention employs electric devices to control the components thereof.

Referring to FIG. 4, solenoid selector valves 7a and 7b are employed to regulate the relief pressures of relief valves 4a and 4b, respectively. A rotating direction detector 91, such as a rotary encoder, is associated with a rotary member of a hydraulic motor 3 or a rotary member of the slewing mechanism (FIG. 7) to detect the rotating direction of the hydraulic motor 3. Pressure switches 92 and 93, as control position detecting means for detecting the position of a control lever 25, are provided respectively in pilot lines 26a and 26b connected to a swing mode control valve 24 to detect the position of the control lever 25 from the pressures in the pilot lines 26a and 26b. A controller 94 decides whether or not the hydraulic motor 3 is operating on the basis of detection signals provided by the rotating direction detector 91 and the pressure switches 92 and 93. If the hydraulic motor 3 is in a driving mode, namely, if the pressure switch 92 or 93 gives a signal indicating the shift of the control lever 25 and the rotating direction detector 91 gives a stop signal to the controller 94 in controlling the hydraulic motor 3 or if the hydraulic motor 3 is in an accelerating mode, the controller 94 provides a signal to place the solenoid selector valve 7a or 7b on the supply side of the hydraulic motor 3 in a lower position (high relief pressure setting position).

Although the hydraulic control system of FIG. 1 and that of FIG. 1 are the same in action and effects, the hydraulic control system of FIG. 4 employing the electrical means is simple in construction, the electrical means relaxes spatial restrictions on piping and enhances the response speed and reliability of the hydraulic control system.

Figure 5:
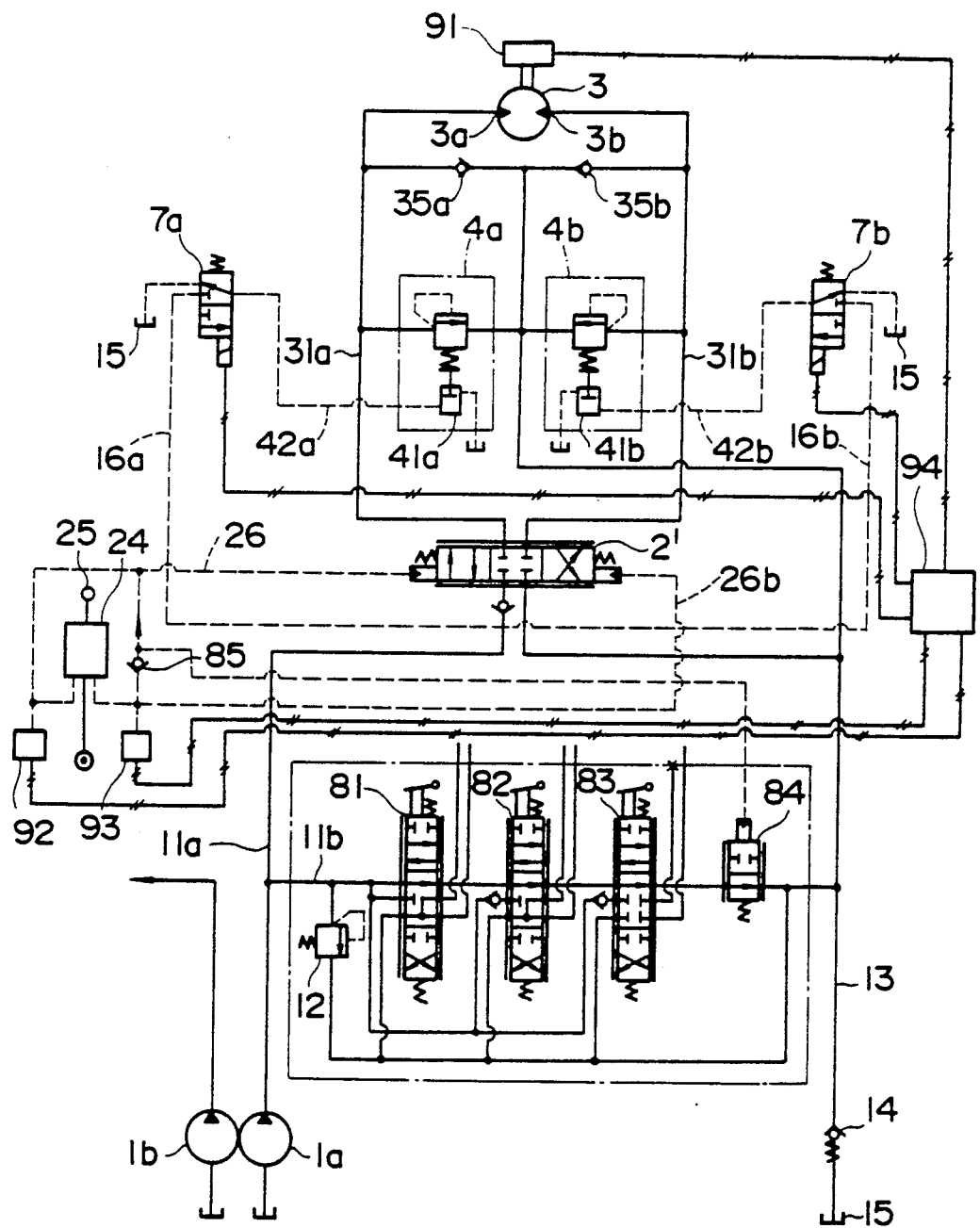

Fifth Embodiment (FIG. 5)

A hydraulic control system in a fifth embodiment according to the present invention shown in FIG. 5 comprises a hydraulic circuit similar to that of the hydraulic control system of FIG. 3, and electrical control means including a rotating direction detector 91, pressure switches 92 and 93, a controller 94 and solenoid selector valves 7a and 7b, which are the same as those employed in the hydraulic control system of FIG. 4. In FIG. 5, parts like or corresponding to those described with reference to FIGS. 3 and 4 are denoted by the same reference characters.

The hydraulic control system of FIG. 5 has advantages, in addition to function and effects the same as those shown in FIG. 1, that the working fluid discharged from the hydraulic pump 1a is used effectively for driving cylinder actuators while the revolving superstructure 120 need not be driven for swing motion, and the electrical control means enhances the response speed and reliability of the hydraulic control circuit.

Although the invention has been described in its preferred forms with a certain degree of particularity, obviously many changes and variations are possible therein. It is therefore to be understood that the present invention may be practiced otherwise than specifically described herein without departing from the scope and spirit thereof.

What is claimed is:

1. A hydraulic control system for controlling the slewing operation of a slewing mechanism for slewing a revolving superstructure, comprising:

a hydraulic pump;

a swing mode selector valve fluidically connected to said hydraulic pump;

a hydraulic motor for driving the slewing mechanism;

two supply-and-discharge lines, each of said supply-and-discharge lines being connected between said swing mode selector valve and a respective port of said hydraulic motor for selectively supplying pressurized fluid to a supply side port of said hydraulic pump when said system is in a driving operating mode;

a main relief valve common to both of said supply-and-discharge lines;

a pair of relief valves capable of being set for a high set relief pressure higher than the set relief pressure of the main relief valve and for a low set relief pressure lower than the set relief pressure of the main relief valve, each of said relief valves being provided in a respective one of said supply-and-discharge lines;

rotating direction detecting means for detecting the rotating direction of the hydraulic motor; and set relief pressure changing means for setting the relief valve associated with the supply side of the hydraulic motor for a higher set relief pressure than the set relief pressure of said main relief valve in response to a detection signal provided by the rotating direction detecting means, and for setting said relief valve associated with the discharge side of the hydraulic motor for a lower set relief pressure than the set relief pressure of said main relief valve, when said hydraulic is operating in the driving mode.

2. A hydraulic control system according to claim 1, wherein said set relief pressure changing means comprises a pair of pilot selector valves each having a high relief pressure setting position for giving a high relief pressure setting signal to a relief pressure setting unit of the associated relief valve and a low relief pressure setting position for giving a low relief pressure setting signal to the relief pressure setting unit of the associated relief valve, each said pilot selector valve comprising means for changing said pilot selector valve between the high relief pressure setting and the low relief pressure setting position in response to hydraulic signals from said rotating direction detecting means.

3. A hydraulic control system according to claim 1, wherein said set relief pressure changing means comprises a pair of solenoid selector valves each having a high relief pressure setting position for giving a high relief pressure setting signal to a relief pressure setting unit of the associated relief valve and a low relief pressure setting position for giving a low relief pressure setting signal to the relief pressure setting unit of the associated relief valve, each said solenoid selector valve comprising means for changing said solenoid selector valve between the high relief pressure setting and the low relief pressure setting position in response to signals from said rotating direction detecting means.

4. A hydraulic control system according to claim 2, wherein said hydraulic control system further includes a swing mode control valve and shift position detecting means for detecting a position of said swing mode control valve.

* * * * *